United States Patent
Kosik et al.

[11] Patent Number: 6,139,467
[45] Date of Patent: Oct. 31, 2000

[54] AUTOMATIC CLUTCH

[75] Inventors: Franz Kosik, Ostfildern; Thomas Grass, Urbach, both of Germany

[73] Assignee: DaimlerChrysler AG, Stuttgart, Germany

[21] Appl. No.: 09/269,279

[22] PCT Filed: Aug. 16, 1997

[86] PCT No.: PCT/DE97/01757

§ 371 Date: Mar. 5, 1999

§ 102(e) Date: Mar. 5, 1999

[87] PCT Pub. No.: WO98/13615

PCT Pub. Date: Apr. 2, 1998

[30] Foreign Application Priority Data

Sep. 25, 1996 [DE] Germany .......................... 196 39 376

[51] Int. Cl.[7] .................................................. B60K 41/02
[52] U.S. Cl. ................... 477/76; 477/87; 477/174
[58] Field of Search ................................. 477/166, 174, 477/76, 70, 86, 87

[56] References Cited

U.S. PATENT DOCUMENTS 4,829,221   5/1989   Grunberg et al. .
6,070,119   5/2000   Hrovat et al. ........................ 477/174 X

FOREIGN PATENT DOCUMENTS 15 05 469   9/1969   Germany .
WO 89/03318   4/1989   WIPO .

Primary Examiner—Charles A Marmor
Assistant Examiner—Saúl Rodríguez
Attorney, Agent, or Firm—Evenson, McKeown, Edwards & Lenahan, P.L.L.C.

[57] ABSTRACT

Disclosed is an automatic clutch intended for an engine-transmission unit in a vehicle. When in the closing stage, the clutch works under contact overpressure conditions, so that the torque transmitted by the clutch is higher by a set quantity than the engine generated torque. At low external temperature, the contact overpressure is reduced, resulting in a shorter clutch adjustment path and in less energy being required for clutching, thereby compensating for the greater stiffness of the clutch control element.

4 Claims, 2 Drawing Sheets

AUTOMATIC CLUTCH

BACKGROUND AND SUMMARY OF THE INVENTION

The invention concerns an automatic clutch in the drive train of a motor vehicle, which has a transmission which is shifted manually between different drive positions or transmission stages. A motorized adjusting unit actuates the clutch and is controlled by a system of sensors which monitors predetermined parameters and releases the clutch if criteria for a change of the transmission stage intended by the driver are detected by the system of sensors. When the transmission stage has been selected, the clutch is controlled in analogous with the torque of the engine with excess contact pressure such that the moment which can be transmitted by the clutch is a predetermined amount above the moment which can be picked up at the engine.

In motor vehicles with customary internal combustion engines, a transmission must be arranged in the drive train to allow the transmission ratio between the speed of the vehicle engine and the speed of the drive wheels to be changed according to the respective travelling speed and loading of the vehicle. In the case of customary manually shifted transmissions, during a change of drive position the power flow between the engine and the drive wheels has to be interrupted by releasing the clutch.

It is known in principle to use automatic clutches for this purpose, i.e. the clutch is automatically released when changing a transmission stage and is subsequently re-engaged. During release of the clutch, spring elements which non-positively clamp the clutch parts on the input and output sides against one another are relieved by the travel of the adjusting unit. During subsequent engagement of the clutch, the spring elements are again clamped with varying intensity to produce an adherent engagement of the clutch.

To minimize the travel of the adjusting unit necessary for releasing the clutch, it is known in principle to keep the clutch engaged with an excess contact pressure changed in an analogous fashion with the torque of the engine, i.e. said spring elements are in each case clamped only with such a level of intensity that the adherent engagement of the clutch allows the transmission of a moment which lies above the respective engine moment only by a limited amount. This is synonymous to saying that the clamping of the spring elements is generally significantly less than the maximum allowed by design.

The limited excess contact pressure in principle offers the advantage that any shocks that there may be in the drive train can lead to a "slipping" of the clutch and consequently be effectively absorbed.

On the other hand, the excess contact pressure must not be too low in order to avoid undesired wearing of the clutch.

The object of the invention is thus to improve the control of the excess contact pressure.

This object is achieved according to the invention by reducing the amount of excess contact pressure at low outside temperatures.

The invention is based on the general idea of controlling the excess contact pressure in a temperature-dependent manner, and of reducing it at low ambient temperatures in order to reduce the energy necessary for releasing the clutch when the adjusting unit has to work against an increased resistance on account of low ambient temperature. The adjusting unit generally operates hydraulically, so that an increased viscosity of the hydraulic medium must be expected at low temperature, i.e. the adjusting unit becomes sluggish.

According to the invention, the energy-increasing effect of the increasing viscosity of the hydraulic medium of the hydraulic clutch adjusting unit as temperatures fall can be compensated, so that the power requirement for the adjusting unit remains limited. Consequently, it can be reliably ensured that the clutch is released quickly when intended shifting by the driver is detected. Quick releasing of the clutch is desired because an interruption of the power flow between the engine and the drive wheels can then take place, and neither the actuating elements for shifting the transmission nor the clutch linings can be excessively loaded, even when the driver changes the transmission stages very quickly, i.e. if the driver "rips through" the gears of the transmission.

Otherwise, with regard to preferred features of the invention, reference is made to the claims and the following explanation of the drawing, on the basis of which particularly preferred embodiments of the invention are described.

DETAILED DESCRIPTION OF THE DRAWINGS

Figure 1:
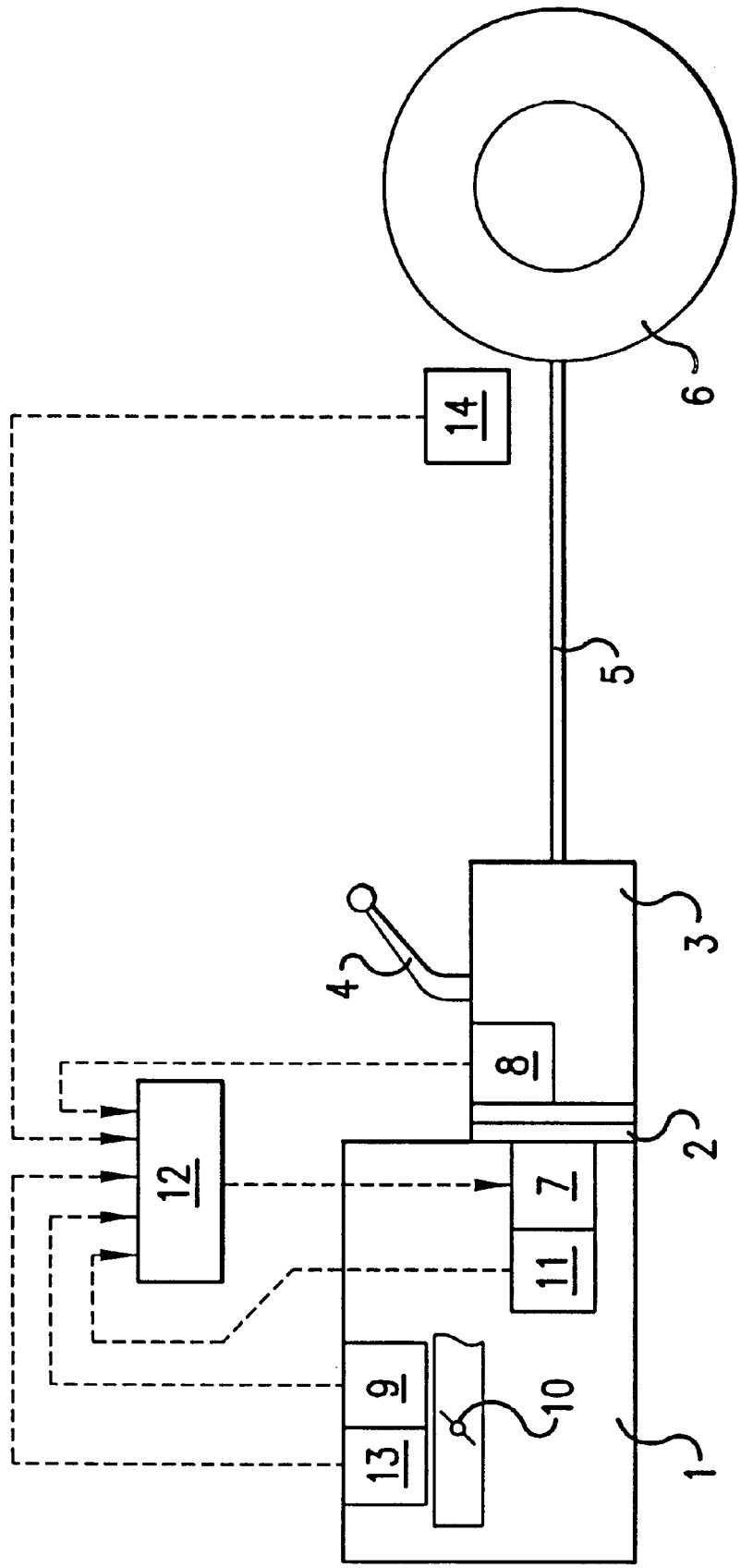
FIG. 1 shows a schematic representation of a drive train of a motor vehicle as well as the components essential for the clutch control.

According to FIG. 1, an internal combustion engine 1 is connected in drive terms via an automatically actuated clutch 2 and a transmission 3. The drive positions or gears of the transmission are changed by manual actuation of a shift lever 4. The transmission is coupled with a drive shaft 5, for example a cardan shaft, to drive wheels 6 of a motor vehicle, otherwise not represented in any more detail.

The actuation of the clutch 2 takes place automatically via a motorized adjusting unit 7. For controlling the adjusting unit 7, a system of sensors is provided for monitoring various parameters of driving operation.

This system of sensors comprises a sensor arrangement 8, which is assigned to the transmission 3 or the shift lever 4 and senses the positions and/or movements of the latter and consequently "knows" the respectively selected drive position or the respectively selected gear. The position of an element serving for controlling the power of the engine 1, for example a throttle valve 10 of the air intake system of the engine 1, is registered by a sensor 9.

Furthermore, the system of sensors comprises a displacement pickup 11, which is assigned to the adjusting unit 7 and senses the position of the latter, and consequently a parameter which is analogous to the value of the moment which can be transmitted by the automatic clutch 2.

The signals of the sensor arrangement 8, of the sensor 9 and of the displacement pickup 11 are processed by a control circuit 12, which controls the adjusting unit 7. The control circuit 12 also communicates with an engine control 13, which has the task of, among other things, maintaining the engine speed at a minimum speed, for instance the idling speed, to the greatest extent independently of the loading of the engine. The engine control 13 also "knows" the respective outside temperature (a temperature sensor is provided for this purpose) and the torque respectively generated by the engine. The control circuit 12 otherwise communicates with speed pickups 14, which are assigned to the vehicle wheels. Consequently, the control circuit can also detect the state of movement of the vehicle and in particular the travelling speed.

On the basis of the exchange of information with the engine control 13, the control circuit 12 can also determine the moment transmitted in each case by the clutch 2 in dependence on the position of the adjusting unit 7. At constant travelling speed, the following applies for the moment $M_K$ transmitted by the clutch 2:

$$M_K = M_{Mot} - J_{Mot} dw_{Mot}/dt,$$

where $M_{Mot}$ is the torque generated by the engine 1, which is detected by the engine control 13, $J_{Mot}$ is the moment of inertia of the engine 1, which is predetermined by the design of the engine 1, and $w_{Mot}$ is the speed of the engine. t denotes time.

Since all engine-related variables can be sensed by the engine control 13 and it can be detected from the signals of the speed pickups 14 whether the vehicle is travelling at approximately constant speed, the control circuit 12 knows on the basis of its interaction with the engine control 13 and the speed pickups 14 the respective clutch moment $M_K$. In addition, the control circuit 12 knows from the signals of the displacement pickup 11 the position of the adjusting unit 7, so that the control circuit 12 can also determine or update the proportionality between the clutch moment $M_K$ and the travel of the adjusting unit 7. As a result, the control circuit 12 thus knows the transmissible moment respectively set at the clutch 2.

During normal driving, i.e. when a drive position or a gear has been selected and the vehicle is travelling unbraked, the adjusting unit 7 is controlled such that the clutch 2 operates with a certain excess contact pressure in relation to the moment of the engine $M_{Mot}$. This is synonymous to saying that the clutch moment $M_K$ which can be transmitted by the clutch 2 is greater than the respective moment of the engine $M_{Mot}$ by a predetermined amount.

Figure 2:
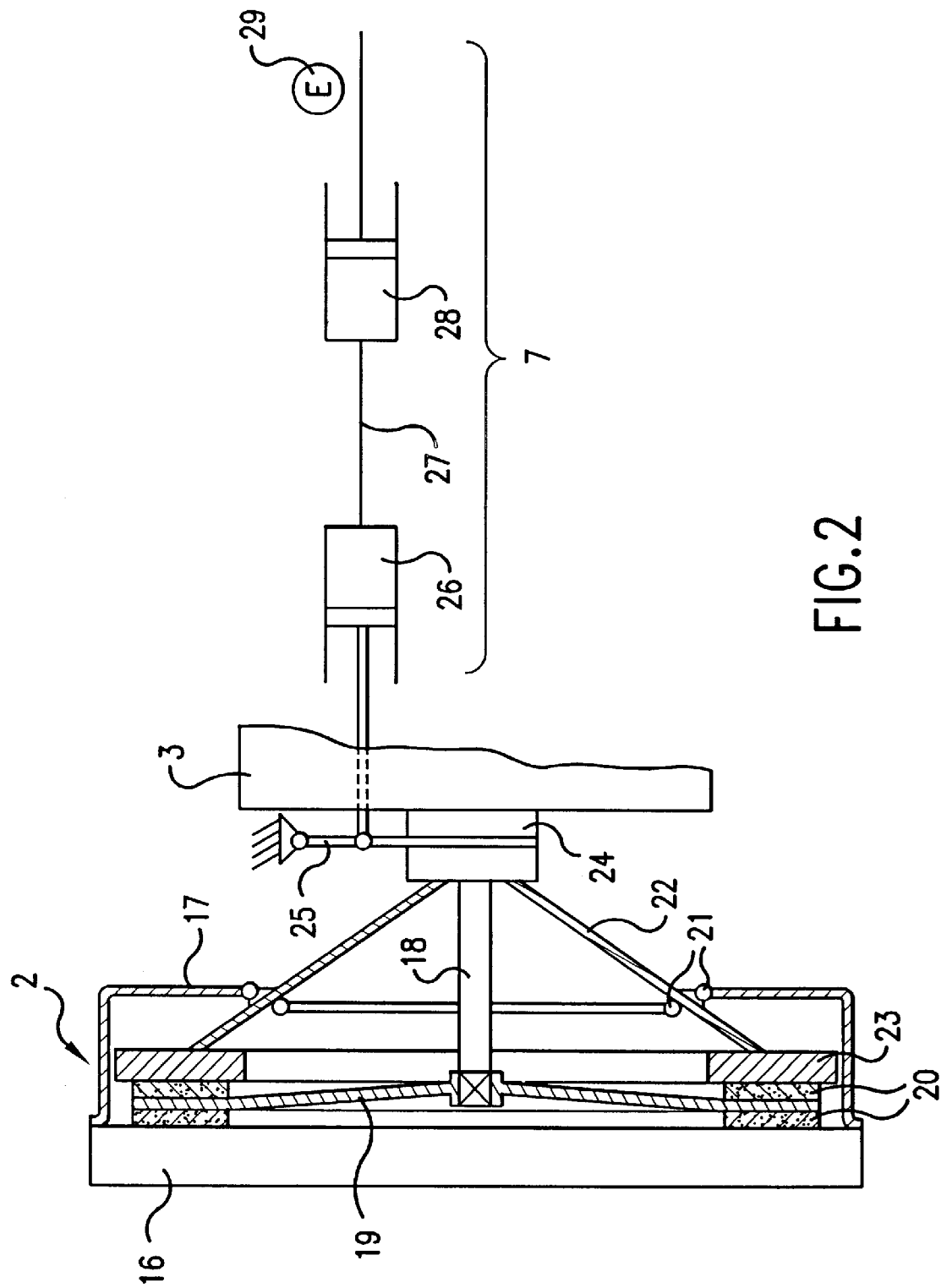
FIG. 2 shows a schematic representation of a hydraulically actuated clutch.

FIG. 2 shows the clutch 2 and its adjusting unit 7.

The engine 1 (not represented in FIG. 2 (cf. FIG. 1)) bears on an output part of its crankshaft a flywheel 16. The flywheel 16 is connected in a rotationally fixed manner to the crankshaft and is firmly connected to an essentially bell-shaped, annular clutch housing 17. Arranged coaxially with respect to the flywheel 16 is an input shaft 18 of the transmission 3. Connected in a rotationally fixed manner to this input shaft 18 is a driven plate 19 of the clutch 2. This driven plate 19 is designed to be axially compliant such that friction linings 20, which are arranged on the outer periphery of the driven plate 19, on the two faces of the latter, can be pressed axially against the flywheel 16. Secured on the clutch housing 17 via bearing rings 21 is a diaphragm spring 22, the concave side of which faces the flywheel 16. On the outer periphery, the diaphragm spring 22 bears an annular pressure plate 23, which completely covers the friction linings 20 of the driven plate 19 radially seen in the axial view. On the inner periphery, the diaphragm spring 22 is rotatably supported on a release bearing 24, which is rotatably mounted in an axially displaceable manner on the input shaft 18.

The release bearing 24 is grasped by a release fork 25, which forms a lever which is movable about a pivot axis perpendicular to the axis of the input shaft 18. The release fork 25 is actuated by means of a hydraulic slave cylinder 26, which communicates via a hydraulic line 27 with a hydraulic master cylinder 28. The piston of the master cylinder 28 is displaceable in the example represented in the figure by an electric motor 29. This electric motor 29 forms, together with the slave cylinder 26, the hydraulic line 27 and the master cylinder 28, the adjusting unit 7 of FIG. 1 and is actuated by the control circuit 12 of FIG. 1.

The clutch 2 described above operates as follows:

The diaphragm spring 22 attempts to push the release bearing 24 to the right into an end position and to push the pressure plate 23 to the left in FIG. 2 such that the driven plate 19 with its friction linings 20 is clamped axially between the mutually facing faces of the flywheel 16 and the pressure plate 23. A very high adherence is achieved between the flywheel 16 and pressure plate 23 on the one hand and the driven plate 19 and the friction linings 20 on the other hand. If the release bearing 24 is displaced in the direction of the flywheel 16, in that the piston of the master cylinder 28 is pushed into the master cylinder 28 by means of the electric motor 29, then the aforementioned adherence is initially increasingly reduced. On further displacement of the release bearing 24 to the left, the driven plate 19 with its friction linings 20 is then released axially between the flywheel 16 and the pressure plate 23, i.e. the clutch 2 is completely released.

The travel necessary in each case for completely releasing the clutch 2 depends on the position of the release bearing 24 before releasing the clutch 2. Since a limited excess contact pressure is used for controlling the clutch 2 in accordance with the present invention, i.e. the clutch is in each case set to a transmissible moment which lies above the engine moment by a predetermined amount, the release bearing 24 will generally not assume its right-hand end position when the clutch is engaged, but rather will be kept at a varying distance from the right-hand end position by means of the adjusting unit 7.

At very cold temperatures, according to the invention, reduced excess contact pressure is used in order to still further reduce the release travel necessary in each case.

What is claimed is:

1. An automatic clutch in a drive train of a motor vehicle having a transmission which is shifted manually between different drive positions or transmission stages, comprising:

a motorized adjusting unit which actuates the clutch;

a system of sensors which monitors predetermined parameters and releases the clutch if criteria for a change of the transmission stage intended by the driver are detected;

wherein when the transmission stage has been selected, the clutch is controlled analogously with the torque of the engine with excess contact pressure such that a moment which can be transmitted by the clutch is a predetermined amount above the moment which can be picked up at the engine, and further wherein the amount of excess contact pressure is reduced at low outside temperatures.

2. The clutch as claimed in claim 1, wherein a hydraulic adjusting unit is provided to adjust the contact pressure.

3. A control system for an automatic clutch in a drive train of a motor vehicle having a manually shiftable transmission and a motorized adjusting unit which actuates the clutch, comprising:

a control unit including a plurality of sensors which monitor predetermined parameters, the control units releasing the clutch if criteria indicating an intended transmission stage change by the driver are detected;

wherein once the transmission stage is selected, the control unit controls the clutch analogously with an engine torque using excess contact pressure such that a moment which is transmittable by the clutch has a value which is a predetermined amount above a moment which is picked up at the engine, and further wherein the amount of excess contact pressure is reduced at low outside temperatures.

4. A method of controlling an automatic clutch in a drive train of a motor vehicle, the method comprising the acts of:

controlling the clutch when the transmission stage has been selected analogously with an engine torque with excess contact pressure, such that a moment which is transmittable by the clutch is a predetermined amount above a moment which can be picked up at the engine; and reducing the amount of excess contact pressure in accordance with lowered outside temperatures.

* * * * *